United States Patent
Chen et al.

(10) Patent No.: US 7,864,525 B2
(45) Date of Patent: Jan. 4, 2011

(54) PORTABLE ELECTRONIC DEVICE INCORPORATING CENTRIFUGAL BLOWER

(75) Inventors: Jr-Shiun Chen, Taipei Hsien (TW); Ching-Bai Hwang, Taipei Hsien (TW); Zhi-Hui Zhao, Shenzhen (CN)

(73) Assignees: Furui Precise Component (Kunshan) Co. Ltd., KunShan, Jiangsu Province (CN); Foxconn Technology Co., Ltd., Tucheng, Taipei County (TW)

( * ) Notice: Subject to any disclaimer, the term of this patent is extended or adjusted under 35 U.S.C. 154(b) by 14 days.

(21) Appl. No.: 12/396,479

(22) Filed: Mar. 3, 2009

(65) Prior Publication Data

US 2009/0303682 A1 Dec. 10, 2009

(30) Foreign Application Priority Data

Jun. 4, 2008 (CN) .................. 2008 1 0067580

(51) Int. Cl.
*H05K 7/20* (2006.01)
(52) U.S. Cl. .............. 361/695; 415/206; 417/423.1; 417/354
(58) Field of Classification Search ........... 361/679.48, 361/690, 694, 695, 697
See application file for complete search history.

(56) References Cited

U.S. PATENT DOCUMENTS

| | | | |
|---|---|---|---|
| 6,447,272 B2 * | 9/2002 | Tsuchiya ............... | 417/423.12 |
| 6,786,706 B2 * | 9/2004 | Shinokubo et al. .......... | 417/354 |
| RE39,787 E * | 8/2007 | Matsumoto ............ | 417/423.15 |
| 2001/0036416 A1* | 11/2001 | Obara ..................... | 417/423.1 |
| 2005/0058543 A1* | 3/2005 | Takeshita et al. ............ | 415/206 |
| 2007/0160458 A1* | 7/2007 | Yen ............................ | 415/119 |
| 2008/0043436 A1 | 2/2008 | Hung et al. | |
| 2008/0130226 A1* | 6/2008 | Yamashita et al. .......... | 361/695 |

* cited by examiner

*Primary Examiner*—Jayprakash N Gandhi
*Assistant Examiner*—Courtney Smith
(74) *Attorney, Agent, or Firm*—Frank R. Niranjan

(57) ABSTRACT

An electronic device includes a casing and a centrifugal blower. The casing includes a bottom cover and a top cover. A sidewall extends from the bottom cover towards the top cover. The centrifugal blower is surrounded by the sidewall and includes a supporting member mounted to the bottom cover, and an impeller rotatablely supported by the supporting member. The impeller includes a hub and a plurality of blades extending outwardly from the hub. Outer portions of the blades extend beyond the supporting member along a radial direction of the hub. Inner portions of the blades have a height gradually increasing along an outward direction. The outer portions have a height equal to a maximum height of the inner portions. Bottom faces of the outer portions of the blades are located below a top surface of a base plate of the supporting member.

10 Claims, 3 Drawing Sheets

PORTABLE ELECTRONIC DEVICE INCORPORATING CENTRIFUGAL BLOWER

BACKGROUND

1. Field of the Disclosure

The disclosure generally relates to portable electronic devices, and particularly to a portable electronic device incorporating a centrifugal blower.

2. Description of Related Art

With the continuing development of electronic technology, processors of the portable electronic devices such as notebook computers or portable DVDs have become faster and faster, which causes the processors to generate more redundant heat. Thermal modules are traditionally disposed in the electronic devices to help transfer of the heat from the processors to an outside, thus to maintain a stability and normal performance of the electronic devices.

Generally, a thermal module is mounted in an enclosure of a portable electronic device to remove heat generated by a processor in the electronic device. The thermal module includes a fin unit thermally attached to the processor to absorb heat therefrom, and a centrifugal blower for generating airflow to take away the heat of the fin unit. The centrifugal blower includes a housing, a hub and a plurality of blades extending radially from the hub. The housing includes a top plate, a bottom plate parallel to the top plate, and a sidewall interconnecting the top plate and the bottom plate. Generally, a thickness of each of the top and bottom plates is about 0.5 millimeter (mm) to 3 mm. The centrifugal blower defines air inlet/inlets in the top plate or/and the bottom plate thereof, and defines an air outlet in the sidewall adjacent to the fin unit. A gap is defined between a top/bottom cover of the enclosure of the electronic device and the top plate/bottom plate of the centrifugal blower for the airflow flowing into the centrifugal blower smoothly. However, the gaps between the top cover/bottom cover of the enclosure and top plate/bottom plate of the centrifugal fan decrease a height of an inner space of the electronic device available for mounting the thermal module, which results in that a thickness of the electronic device needs to increase in order to increase the height of the inner space. In addition, the existence of the top and bottom plates of the centrifugal blower further requires an increase of the thickness of the electronic device in order to accommodate the thermal module. Such increase in thickness of the electronic device conflicts with the requirement of lightness, thinness, compactness and miniaturization of the portable electronic devices.

What is needed, therefore, is a portable electronic device with a centrifugal blower, which overcomes the described limitations.

DETAILED DESCRIPTION

Figure 1:
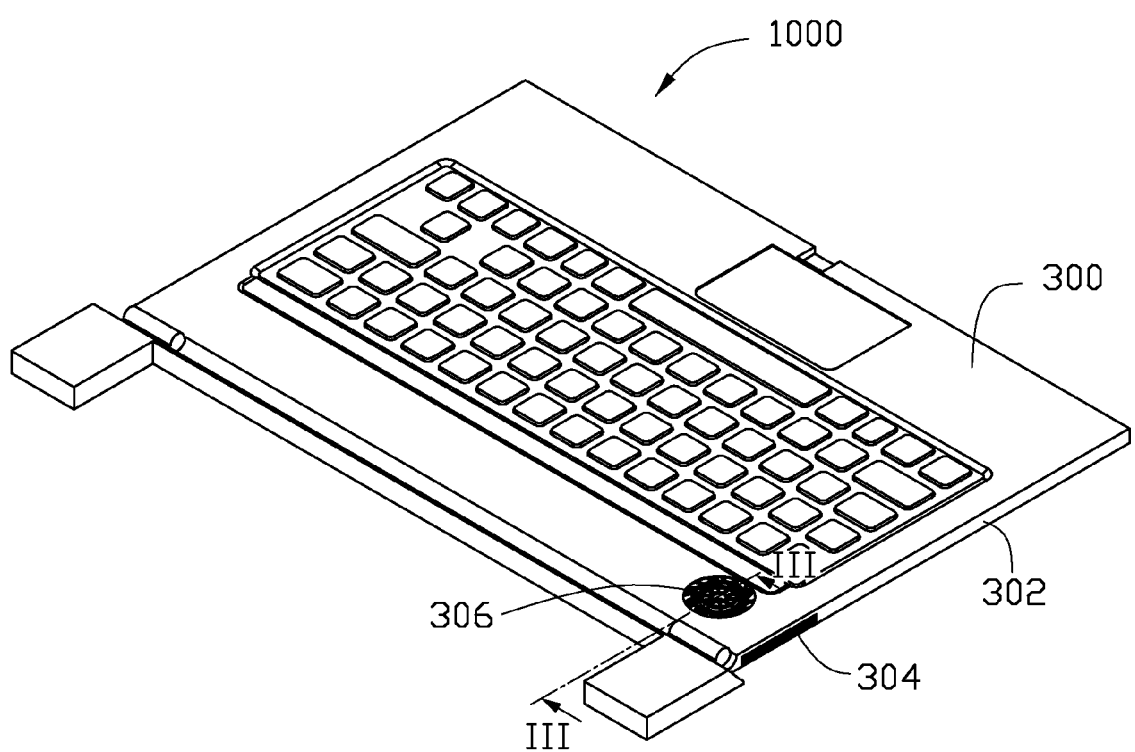
FIG. 1 is an assembled view of a portable electronic device according to an exemplary embodiment.

Referring to FIG. 1, a portable electronic device according to an exemplary embodiment is shown. The portable electronic device can be a notebook computer, a portable DVD player, etc. FIG. 1 shows a chassis including a keyboard of the portable electronic device. A display panel which is pivotably connected to the chassis is not shown.

Figure 2:
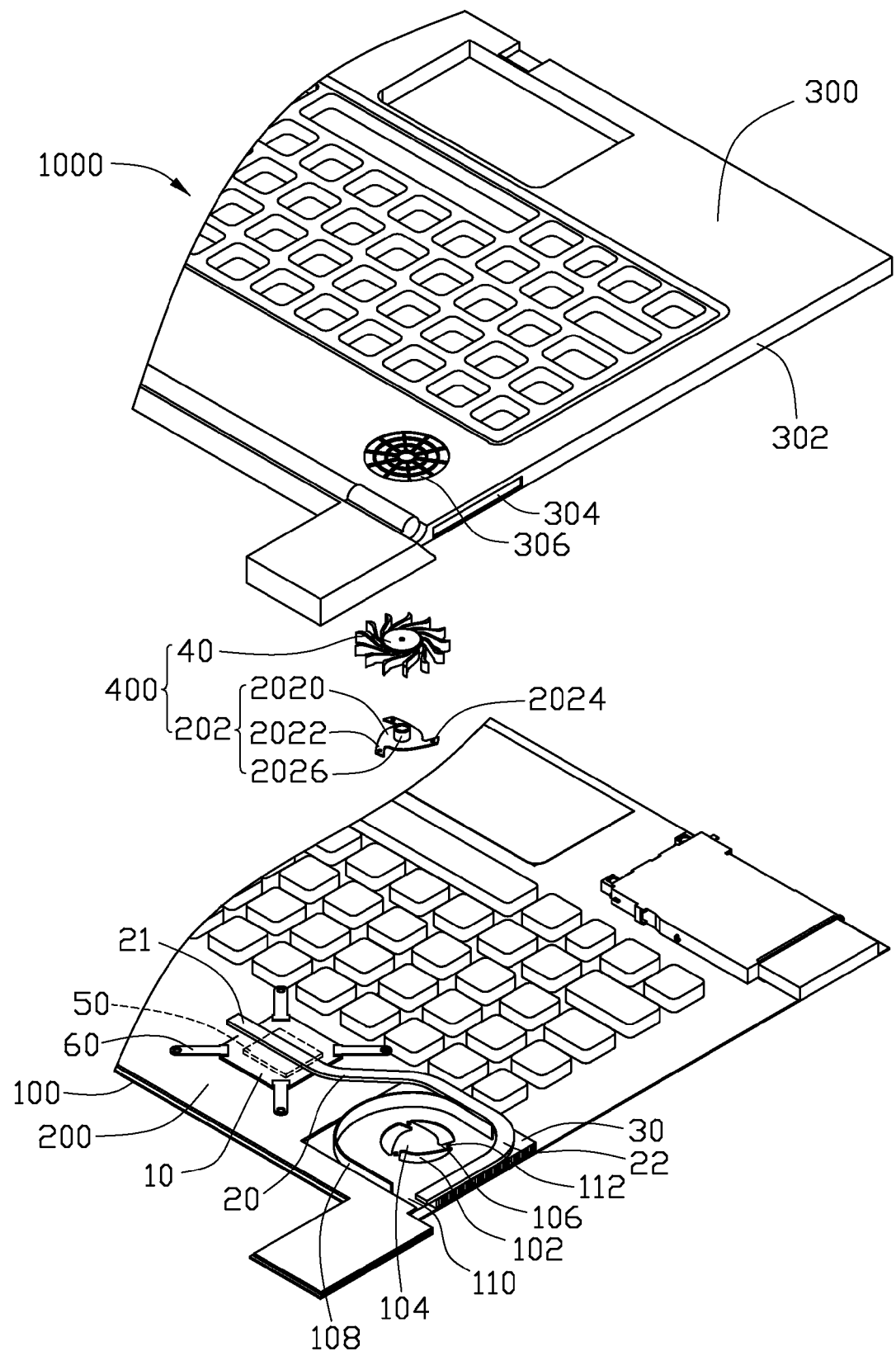
FIG. 2 is an enlarged, exploded view of a part of the portable electronic device of FIG. 1.

Referring to FIG. 2, the chassis of the portable electronic device includes a casing 1000 receiving a circuit board 200 therein, an electronic component 50 such as a CPU mounted on the circuit board 200, and a thermal module thermally received in the casing 1000 and connected to the electronic component 50 to transfer heat generated by the electronic component 50 to an outside of the portable electronic device. The casing 1000 includes a bottom cover 100, a top cover 300 parallel to the bottom cover 100, and a flange 302 extending downwardly from an outer periphery of the top cover 300. A space is thus defined among the bottom cover 100, the top cover 300 and the flange 302 for receiving the electronic component 50, the circuit board 200 and the thermal module therein. A ventilation hole 304 is defined in the flange 302 for airflow flowing in/out of the casing 1000.

Figure 3:
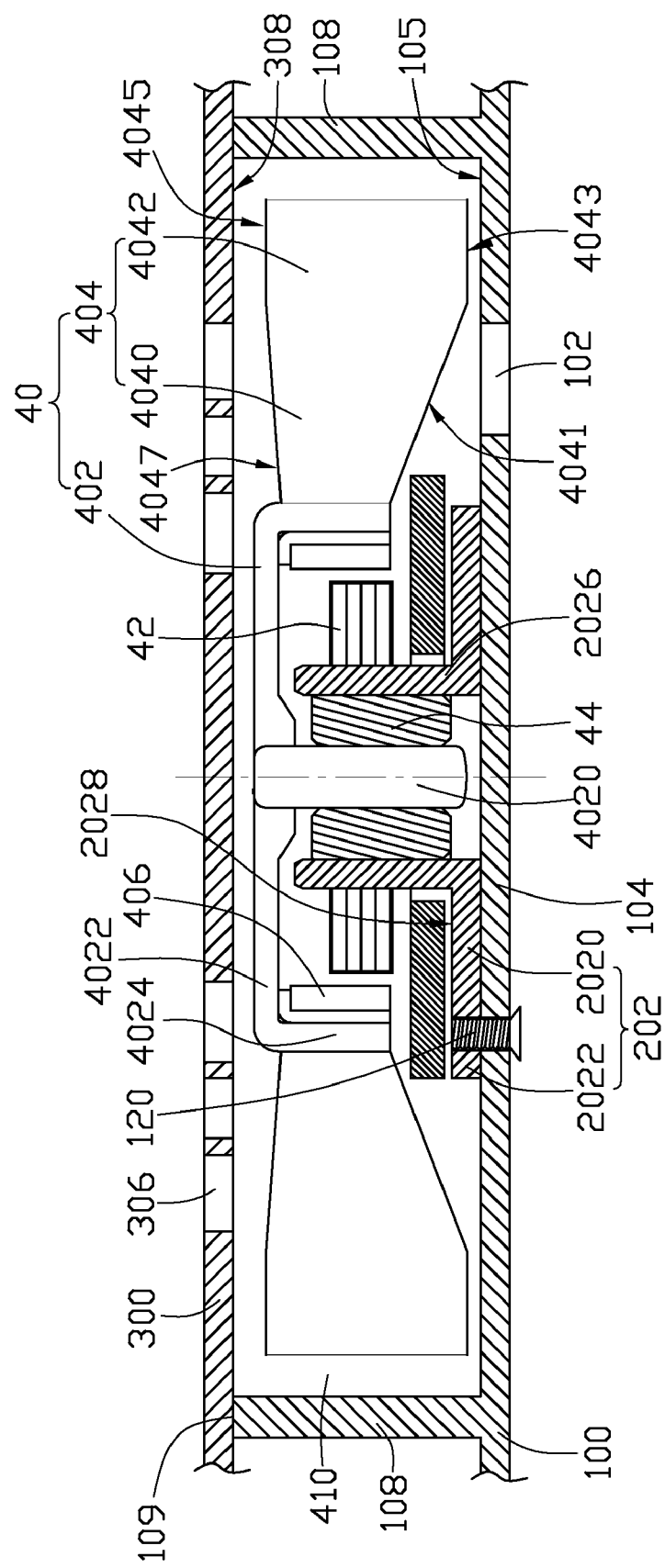
FIG. 3 is an enlarged, cross-section view of the portable electronic device of FIG. 1, taken along line III-III.

Referring to FIG. 3, a sidewall 108 extends integrally and upwardly from an inner surface 105 of the bottom cover 100 to contact with an inner surface 308 of the top cover 300, i.e., a free end 109 of the sidewall 108 abuts the inner surface 308 of the top cover 300. As viewed from a top side, the sidewall 108 is substantially U-shaped, and defines a linear opening 110 in a right side thereof facing the ventilation hole 304. A receiving room 410 is defined among the bottom cover 100, the top cover 300 and the sidewall 108. The bottom cover 100 defines a circular air inlet 102 in a portion of the bottom cover 100 surrounded by the sidewall 108. Thus exterior air can enter into the receiving room 410 via the air inlet 102. A rounded mounting portion 104 is formed by the bottom cover 100 within the air inlet 102. A plurality of arms 106 extend from the rounded mounting portion 104 to connect the rounded mounting portion 104 with other portions of the bottom cover 100. The air inlet 108 is divided into a plurality of sector-shaped apertures by the arms 106 and the mounting portion 104. Each of the arms 106 defines a mounting hole 112 therein.

Referring to FIG. 2 again, the thermal module includes a heat spreader 10, a generally L-shaped heat pipe 20, a fin unit 30 and a centrifugal blower 400. The heat spreader 10 is mounted on the electronic component 50 via four resilient legs 60 secured to the circuit board 200 and the heat spreader 10. A bottom surface of the heat spreader 10 is thermally attached to the electronic component 50. The fin unit 30 is arranged at the opening 110 of the sidewall 108 and includes a plurality of fins parallel to each other. The heat pipe 20 includes an evaporating section 21 thermally attached to a top surface of the heat spreader 10, and a condensing section 22 thermally attached to the fin unit 30, and thus to transfer heat from the heat spreader 10 to the fin unit 30.

Referring to FIG. 3 at the same time, the centrifugal blower 400 is arranged in the receiving room 410. The opening 110 of the sidewall 108 functions as air outlet of the centrifugal blower 400. The centrifugal blower 400 includes a supporting member 202 disposed on the mounting portion 104 of the bottom cover 100, a stator 42 mounted around the supporting member 202, and an impeller 40 rotatably mounted to the supporting member 202. The supporting member 202 includes an annular base plate 2020, a central tube 2026 extending perpendicularly and upwardly from a top surface of the base plate 2020, and a plurality of ribs 2022 extending horizontally and outwardly from an outer periphery of the base plate 2020 corresponding to the arms 106 of the bottom cover 100. Each of the ribs 2022 defines a fixing hole 2024 therein corresponding to the mounting hole 112 of the arm 106. A plurality of bolts 120 extend through the mounting holes 112 of the arms 106 from a bottom side of the bottom cover 100 and threaded into the fixing holes 2024 of the ribs, for mounting the supporting member 202 onto the bottom cover 100.

The impeller 40 is arranged between the bottom cover 100 and the top cover 300 of the casing 1000, and includes a hub 402 and a plurality of blades 404 extending radially and outwardly from the hub 402. The hub 402 includes a circular top wall 4022, a cylindrical wall 4024 extending downwardly from an outer periphery of the top wall 4022, a magnet 406 attached to an inner surface of the annular wall 4024, and a shaft 4020 extending downwardly from a center of the top wall 4022. When assembled, the shaft 4020 is rotatably received in the central tube 2026 through a bearing 44 for mounting the impeller 40 to the central tube 2026.

Each of the blades 404 extends outwardly from the annular wall 4024 of the hub 402 along a clockwise direction, as viewed from FIG. 2. Each of the blades 404 includes a first blade portion 4040 fixed to the annular wall 4024 of the hub 402 and a second blade portion 4042 extending outwardly from a distal end of the first blade portion 4040. Each of the first blade portions 4040 has a top face 4047 facing the top cover 300 and an opposite bottom face 4041 facing the bottom cover 100. The top face 4047 of the first blade portion 4040 extends slightly upwardly along an extension direction of the first blade portion 4040, and the bottom face 4041 of the first blade portion 4040 extends slantwise downwardly along the extension direction of the first blade portion 4040. Thus a longitudinal height of the first blade portion 4040 gradually increases as the first blade portion 4040 extends outwardly from the hub 402 towards the second blade portion 4042. The bottom face 4041 of the first blade portion 4040 at the distal end is lower than the bottom face 4041 of the first blade portion 4040 at an inner end fixed to the annular wall 4024. An outer diameter defined by the first blade portions 4040 of the blades 404 is substantially equal to a diameter of the air inlet 102. An outer diameter defined by free ends of the ribs 2022 of the supporting member 202 is smaller than the outer diameter defined by the first blade portions 4040 of the blades 404. In other words, the entire supporting member 202 is located within a region covered by the first blade portions 4040 of the blades 404 and the hub 402.

Each of the second blade portions 4042 has a top face 4045 facing the top cover 300 and an opposite bottom face 4043 facing the bottom cover 100. The top face and the bottom face 4043 of the second blade portion 4042 are horizontal and parallel to the base plate 2020 of the supporting member 202. The longitudinal height of each of the second blade portions 4042 is constant, and is substantially equal to that of the first blade portion 4040 at the distal end thereof. In other words, the longitudinal height of the second blade portions 4042 equals to a maximal longitudinal height of the first blade portions 1211. The second blade portions 4042 of the blades 404 extend beyond the entire supporting member 202 along a radial direction of the hub 402. Thus, the bottom face 4043 of the second blade portion 4042 can be lower than a top surface of the base plate 2020 of the supporting member 202, which increases the longitudinal height of the second blade portion 4042.

The top cover 300 of the casing 1000 further defines a plurality of through holes 306 at a region corresponding to the impeller 40 of the centrifugal blower 400 for functioning as another air inlet. The exterior air enters into the receiving room 410 also via the through holes 306. During operation of the centrifugal blower 400, the impeller 40 rotates to generate forced airflow. The air in the outside can be drawn into the casing 1000 through both of the through holes 306 of the top cover 300 and the air inlet 102 of the bottom cover 100; thus, an amount of the airflow entering into the casing 1000 can be increased. Then the air is driven by the impeller 40 to the opening 110 of the sidewall in which the fin unit 30 is arranged. Finally, the air flows though the fin unit 30 to exchange heat with the fin unit 30, and then flows to the outside of the portable electronic device through the ventilation hole 304 for dissipating heat to the ambient environment.

In this embodiment, the top and bottom covers 300, 100 of the casing 1000 of the electronic device function as the top and bottom plates of the blower 400; thus, top and bottom plates of the conventional blower are avoided, and a height of the impeller 40 can be increased. Accordingly, a height of the blade 404 is increased. In addition, since the supporting member 202 of the centrifugal blower 400 is a separate component and located within a region covered by the first blade portions 4040 of the blades 404, a longitudinal height of the second blade portion 4042 can be further increased. As a result, a size of each blade 404 is increased, and more air can be driven by each of the blades 404 with increased size to generate a large amount of airflow during operation of the centrifugal blower 400. Thus the airflow of the impeller 40 can take away more heat of the fin unit 30 absorbed from the electronic component 50. Therefore, the electronic device incorporating the thermal module according to the disclosure can have a relatively small size and have a relatively higher heat dissipation efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A centrifugal blower for being mounted in an electronic device to generate an airflow in the electronic device, the electronic device having a cover defining an air inlet, the centrifugal blower comprising:

a supporting member for being mounted on the cover at a position near the air inlet; and an impeller rotatably mounted to the supporting member, the impeller comprising a hub and a plurality of blades extending radially and outwardly from an outer circumferential surface of the hub, each of the blades comprising an inner portion located over the supporting member and an outer portion extending beyond the supporting member along a radial direction of the hub, a height of the outer portion being larger than that of the inner portion for increasing a size of the blades;

wherein the supporting member comprises an annular base plate, a central tube extending up from the base plate for supporting the impeller, and a plurality of ribs extending horizontally and outwardly from an outer periphery of the base plate, an outer diameter defined by free ends of the ribs of the supporting member being smaller than an outer diameter defined by the free ends of the blades; and wherein the outer portion of each of the blades comprises a bottom face being not higher than a top surface of each of the ribs of the supporting member.

2. The centrifugal blower of claim 1, wherein the inner portions of the blades are connected with the hub and the outer portions of the blades extend from distal ends of the inner portions, a longitudinal height of each of the inner portions of the blades being increased along an extension direction of the each of the inner portions, and a longitudinal height of each of the outer portions of the blades being constant along an extension direction thereof and being not smaller than a maximum height of the each of the inner portions.

3. The centrifugal blower of claim 2, wherein the supporting member is located completely within a region covered by the inner portions of the blades and the hub.

4. A portable electronic device comprising:
  a casing adapted for accommodating a circuit board and electronic components therein, the casing comprising a bottom cover and an opposite top cover;
  a sidewall extending integrally and perpendicularly from one of the bottom cover and the top cover towards the other one of the bottom cover and the top cover; and
  a centrifugal blower received in the casing and surrounded by the sidewall, the centrifugal blower comprising:
  a supporting member mounted to the bottom cover; and
  an impeller rotatably supported by the supporting member, the impeller comprising a hub and a plurality of blades extending radially and outwardly from an outer circumferential surface of the hub, each of the blades having an inner portion connecting with the hub and an outer portion extending outwardly from a distal end of the inner portion, the inner portion having a height increasing along an outwardly extending direction of the inner portion;
  wherein the supporting member comprises a base plate, a central tube extending perpendicularly and upwardly from a center of the base plate for supporting the impeller thereon, and a plurality of ribs extending horizontally and outwardly from an outer periphery of the base plate, an outer diameter defined by free ends of the ribs of the supporting member being smaller than an outer diameter defined by the distal ends of the inner portions of the blades, the outer portion of each of the blades being located out of the supporting member and having a bottom face located below a top surface of each of the ribs of the supporting member.

5. The portable electronic device of claim 4, wherein a height of the outer portion of each blade is constant and not smaller than a maximum height of the inner portion of each blade.

6. The portable electronic device of claim 5, wherein the supporting member is located completely within a region covered by the inner portions of the blades and the hub.

7. The portable electronic device of claim 4, wherein an air inlet is defined in the bottom cover, and the supporting member is mounted on the bottom cover at a portion thereof surrounded by the air inlet.

8. The portable electronic device of claim 7, wherein the top cover defines a plurality of through holes at a region corresponding to the impeller of the centrifugal blower for functioning as another air inlet.

9. The portable electronic device of claim 4, wherein the sidewall defines an opening for functioning as an air outlet of the centrifugal blower.

10. The portable electronic device of claim 9, wherein a free end of the sidewall abuts the other one of the bottom cover and the top cover.

* * * * *